United States Patent
Boardman et al.

(10) Patent No.: US 9,212,869 B1
(45) Date of Patent: Dec. 15, 2015

(54) PASSIVE RANGE ESTIMATING ENGAGEMENT SYSTEM AND METHOD

(71) Applicant: Lockheed Martin Corporation, Bethesda, MD (US)

(72) Inventors: Jonathan A. Boardman, Mount Laurel, NJ (US); Jeffrey B. Boka, Lumberton, NJ (US); Purusottam Mookerjee, Bridgewater, NJ (US); Naresh R. Patel, Mullica Hill, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 284 days.

(21) Appl. No.: 13/803,907

(22) Filed: Mar. 14, 2013

(51) Int. Cl.

| | |
|---|---|
| *G01S 13/86* | (2006.01) |
| *G01S 13/72* | (2006.01) |
| *G01S 13/66* | (2006.01) |
| *G01S 5/02* | (2010.01) |
| *G01S 7/292* | (2006.01) |
| *F41G 7/00* | (2006.01) |
| *F41H 11/02* | (2006.01) |
| *G01S 13/88* | (2006.01) |
| *G01S 7/295* | (2006.01) |

(52) U.S. Cl.
CPC ............... *F41G 7/008* (2013.01); *F41H 11/02* (2013.01); *G01S 5/0294* (2013.01); *G01S 7/292* (2013.01); *G01S 7/295* (2013.01); *G01S 7/2923* (2013.01); *G01S 13/66* (2013.01); *G01S 13/72* (2013.01); *G01S 13/726* (2013.01); *G01S 13/86* (2013.01); *G01S 13/883* (2013.01)

(58) Field of Classification Search
CPC ............... G01S 5/0294; G01S 7/292–7/2927; G01S 7/295; G01S 7/2955; G01S 13/66–13/726; G01S 13/86–13/867
USPC .......................... 342/52, 53, 89–97, 175, 189
See application file for complete search history.

(56) References Cited

U.S. PATENT DOCUMENTS

| | | | | |
|---|---|---|---|---|
| 4,817,495 | A * | 4/1989 | Drobot ........................... | 89/1.11 |
| 5,365,236 | A * | 11/1994 | Fagarasan et al. .............. | 342/53 |
| 5,611,502 | A * | 3/1997 | Edlin et al. .................... | 244/3.16 |
| 5,798,942 | A * | 8/1998 | Danchick et al. ............... | 342/96 |
| 5,960,097 | A * | 9/1999 | Pfeiffer et al. ................. | 382/103 |
| 6,845,938 | B2 | 1/2005 | Muravez | |
| 6,877,691 | B2 * | 4/2005 | DeFlumere et al. ......... | 244/3.16 |
| 7,009,554 | B1 * | 3/2006 | Mookerjee et al. ........... | 342/195 |
| 7,032,858 | B2 * | 4/2006 | Williams ...................... | 244/3.15 |
| 7,180,443 | B1 * | 2/2007 | Mookerjee et al. ........... | 342/195 |
| 7,193,557 | B1 * | 3/2007 | Kovacich et al. ............... | 342/89 |
| 7,236,121 | B2 * | 6/2007 | Caber ............................ | 342/62 |
| 7,277,047 | B1 * | 10/2007 | Mookerjee et al. ........... | 342/195 |
| 7,292,179 | B2 * | 11/2007 | Schroeder et al. ............ | 342/118 |
| 7,375,679 | B1 * | 5/2008 | Mookerjee et al. ........... | 342/195 |
| 7,511,252 | B1 * | 3/2009 | Pedersen et al. ............... | 244/3.1 |
| 7,626,534 | B1 * | 12/2009 | Boka et al. ...................... | 342/90 |
| 7,663,528 | B1 * | 2/2010 | Malakian et al. .............. | 342/13 |
| 7,719,461 | B1 * | 5/2010 | Mookerjee et al. ............ | 342/95 |
| 7,875,837 | B1 * | 1/2011 | Szabo et al. .................. | 244/3.15 |
| 8,115,148 | B1 * | 2/2012 | Boardman et al. ........... | 244/3.14 |

(Continued)

*Primary Examiner* — Peter Bythrow
(74) *Attorney, Agent, or Firm* — Howard IP Law Group, PC

(57) ABSTRACT

A system and method for determining a 3-dimensional target position and velocity using 2-dimensional IR sensor angular measurements for objects travelling in a ballistic manner within an IR sensor's field of view (FOV). Resulting 3-dimensional states may be used to generate updated inputs for correlation and object selection to drive missile guidance and intercept operations.

20 Claims, 8 Drawing Sheets

(56) References Cited

U.S. PATENT DOCUMENTS

| | | | |
|---|---|---|---|
| 8,134,103 B2* | 3/2012 | Luu et al. | 244/3.1 |
| 8,138,965 B1* | 3/2012 | Luu et al. | 342/90 |
| 8,288,696 B1* | 10/2012 | Boka et al. | 244/3.11 |
| 8,378,880 B1* | 2/2013 | Boka et al. | 342/53 |
| 8,400,511 B2 | 3/2013 | Wood et al. | |
| 2003/0184468 A1* | 10/2003 | Chen et al. | 342/52 |
| 2006/0082490 A1* | 4/2006 | Chen et al. | 342/52 |
| 2006/0279453 A1* | 12/2006 | Caber | 342/97 |

* cited by examiner

PASSIVE RANGE ESTIMATING ENGAGEMENT SYSTEM AND METHOD

FIELD OF THE INVENTION

The disclosed system and method relate to missile tracking. More specifically, the disclosed system and method relate to tracking and intercept of a ballistic missile (BM).

BACKGROUND OF THE INVENTION

In the engagement and intercept of a hostile ballistic missile (BM), a weapon system will typically track the ballistic missile objects using a ground-based radio frequency (RF) sensor and transmit track information to an intercepting missile for processing. The intercepting missile is typically equipped with an infrared (IR) sensor which is used to acquire and track the hostile ballistic missile objects as part of the engagement sequence.

Hostile ballistic missiles, however, can be expected to deploy decoy objects to conceal the warhead(s) and avoid tracking and interception. Multiple objects from one or more BM launch events may therefore be present in the IR sensor field of view (FOV). In order to select and guide to the targeted object, a correlation process takes place in order to relate the RF track information to the IR track information. However, uncertainties in both the RF and IR tracks, due at least in part to measurement noise and systematic errors can lead to degraded correlation performance. In addition, for certain intercept geometries, the objects observed by the IR sensor may appear close together in angle and be separated by unknown distances in range. Objects closely spaced within the IR sensor FOV relative to the magnitude of their uncertainties results in diminished resolvability. This brings about degraded correlation performance. The accuracy of the correlation process is important to the success of the intercept. Furthermore, determination of the object of interest drives missile guidance algorithms to complete the intercept. Cases where the object of interest is incorrectly determined may result in extremely degraded intercept performance.

In many cases, objects may be separated by significant distances in missile-to-object range. However, due to the "angles-only" nature of the IR sensor measurements, missile-to-object range is not directly available.

Prior art implementations of BM engagement systems rely on object separation within the IR sensor FOV to be above an identified threshold and do not account for missile-to-object range in their correlation processing. For cases with objects spaced closely in angle with respect to the IR sensor focal plane, complications may result.

Alternative systems and methods are desired.

SUMMARY OF THE INVENTION

An aspect of the present disclosure derives a 3-dimensional target position and velocity using 2-dimensional IR sensor angular measurements for objects travelling in a ballistic manner within the IR sensor's FOV. In one embodiment, the resulting 3-dimensional states are used to generate updated inputs for correlation and object selection, which may yield enhanced system performance. The selection of the target object is used to drive missile guidance algorithms and complete the intercept.

BRIEF DESCRIPTION OF THE DRAWINGS

The details of the invention, both as to its structure and operation, may be obtained by a review of the accompanying drawings, in which like reference numerals refer to like parts, and in which.

DETAILED DESCRIPTION

Figure 1:
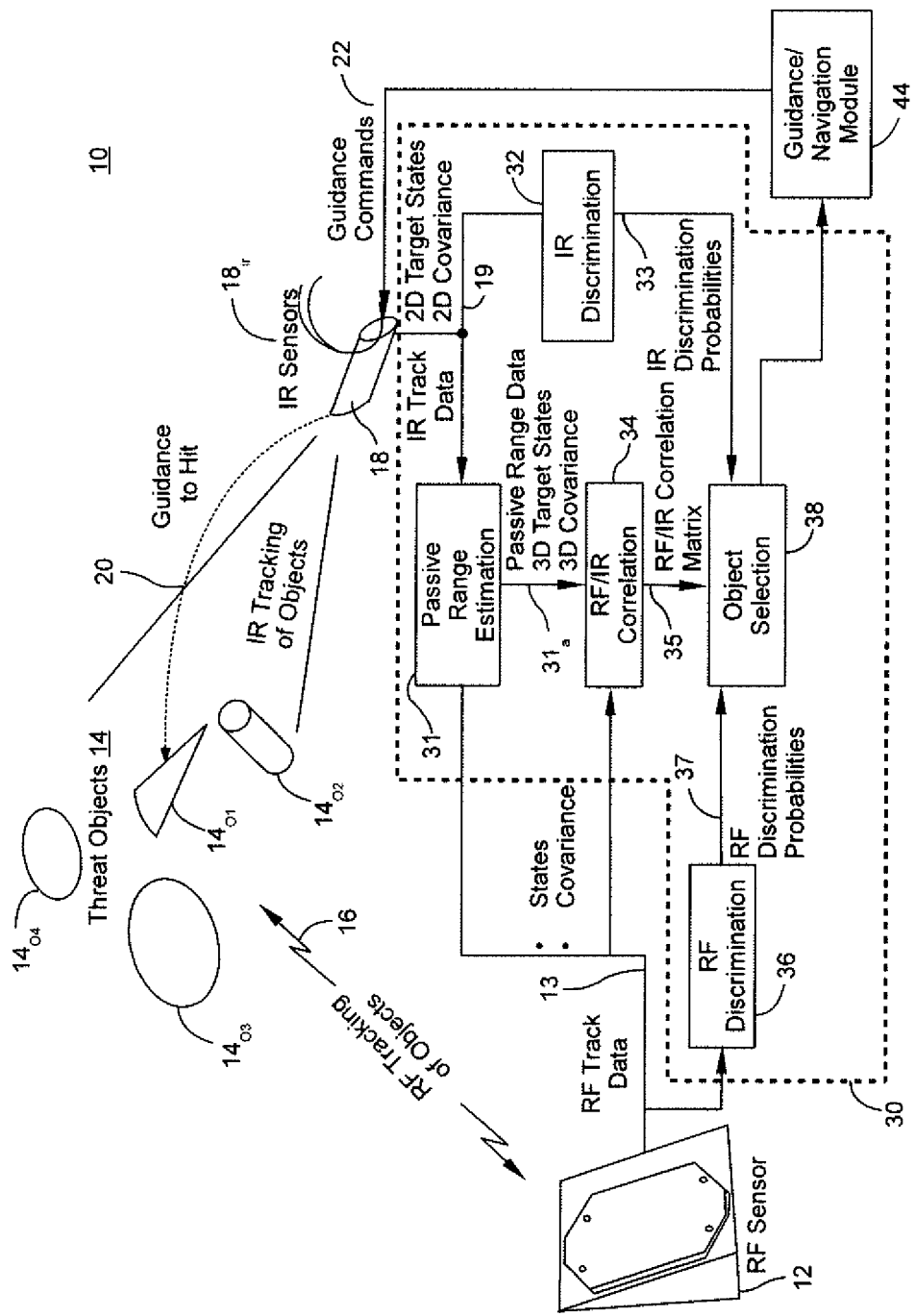
FIG. 1 is a simplified block diagram illustrating a system including an object sensing and discrimination arrangement and a threat engagement arrangement reliant on the discrimination arrangement.

It is to be understood that the figures and descriptions of the present invention have been simplified to illustrate elements that are relevant for a clear understanding of the present invention, while eliminating, for purposes of clarity, many other elements found in radar detection, tracking and engagement systems that employ RF and IR sensors. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

According to an aspect of the disclosure, a system based on multi-sensor discrimination and correlation is provided in which two dimensional (2D) IR sensor angular measurements are used to passively estimate missile to object range and three dimensional (3D) position and velocity for ballistic objects. The range derived provides an additional dimension of object separation for input to an RF/IR correlation algorithm, thereby resulting in improved object selection, higher probability for engagement success, mitigation of effects of challenging intercept geometries, and improved guidance and navigation of intercepting missiles.

Although the system of the disclosure is described in the context of a missile weapon system, it should be noted that the methodology could be used in other applications where passive range estimation of an object is needed, and/or where multiple probabilities from varying sensors or sources need to be combined in an "optimal" sense, factoring in the confidence levels of each source or sensor.

Figure 3:
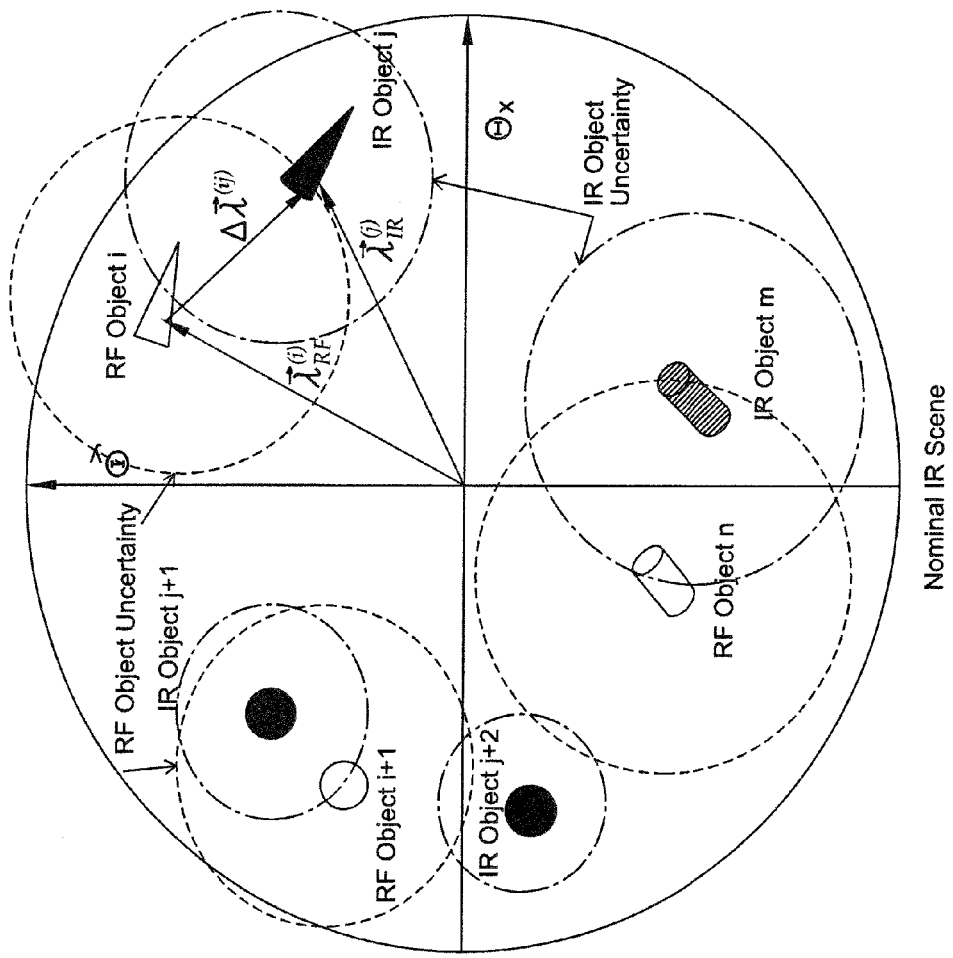
FIG. 3 is a notional representation of ballistic objects to be discriminated in a nominal IR scenario where objects are separated by sufficient distances relative to their uncertainties within the IR sensor focal plane.

In FIG. 1, a scenario 10 includes a radio-frequency sensor 12 such as a radar system, which tracks a cloud 14 of objects $14_{O1}$, $14_{O2}$, $14_{O3}$, and $14_{O4}$ by means of one or more radio-frequency (RF) radar beams, illustrated by a "lightning bolt" symbol 16. Sensor 12 may be on the Earth's surface (land or sea) rather than airborne. The cloud 14 may originate from a hostile missile, one portion of which, after deployment, may be manifested as object $14_{O1}$. The radar sensor system 12 produces RF track data, which is made available to an object selection and discrimination system designated generally as 30 and which includes an RF discrimination system designated generally as 36 and an RF/IR correlation system designated generally as 34. Object $14_{O1}$ of cloud 14 of FIG. 1 is illustrated as a conical object, suggesting that it is the reentry device against which action is to be taken; details of the cloud or set 14 are illustrated in FIG. 3. Also in FIG. 1, an anti-missile missile or interceptor missile 18 is illustrated as being guided along a guidance track 20 by guidance commands transmitted over a path 22 from a guidance/navigation module illustrated as a block 44. Interceptor missile 18 is fitted with an optical or infrared sensor 18ir, which generates infrared tracking data relating to those objects of cloud 14 within its field of view. The infrared tracking data is applied by way of a path 19 to an IR discriminator illustrated as a block 32 and to RF/IR correlation block 34 of object sensing and discrimination system 30. RF/IR correlation block 34 also receives RF track data from RF sensor 12 by way of a path 13. Object selection and discrimination system 30 of FIG. 1 also includes an RF discrimination function illustrated as a block 36, which receives RF track data by way of path 13. A probabilistic object selection function illustrated as block 38 receives discriminated infrared information from block 32 by way of a path 33, discriminated RF information from block 36 by way of a path 37, and RF/IR correlation information from block 34 by way of a path 35. The threat objects of set 14 deployed from the hostile missile are tracked by both RF sensor 12 and IR sensor 18ir.

According to an aspect of the disclosure, two dimensional IR target states and covariance data from IR sensor 18ir along with RF target states and covariance data from RF sensor 12 are input to passive range estimation module 31 for determining object range data including three dimensional target states and three dimensional covariance data for input over path 31a to RF/IR correlation module 34. The passive range estimation data is used to provide enhanced correlation data for increased probability of correct object selection and guide-to-object navigation (in this case, the guide-to object is conical element 14o1). The interceptor missile is guided toward the selected object for the purpose of hitting and killing it using the kinetic energy of the collision, or at least bringing the interceptor missile within a range in which an explosive charge can be effectively used.

As shown in FIG. 1, the deployed threat and decoy objects of set 14 are tracked by both RF and IR sensors. The same object may not be tracked by each sensor, and also the number of objects may not be equal in the Field of View (FOV) of each tracking sensor. The lack of exact correspondence between the number of objects tracked by the RF and optical sensors may be attributable, in part, to the time required for the RF sensor to scan over its field-of-view, including the cloud, and to the limited and continually-changing field of view of the optical sensor. The discrimination function and algorithm represented by selection and engagement system 30 computes the tracked object discrimination probability using tracking data from the various sensors. The system uses the outputs of the IR and RF discrimination algorithms of blocks 32 and 36 to identify the object types of the RF and IR tracked objects. The RF and IR discrimination processing blocks 32, 36 as well as RF/IR correlation and object selection processing blocks 34 and 38 may be implemented according to known methods, such as by way of non-limiting example, the processing described in U.S. Pat. No. 8,378,880 issued Feb. 19, 2013 in the name of Boka et al., and assigned to the assignee of interest herein, the subject matter thereof incorporate herein by reference in its entirety.

It should be noted that the various processing blocks, namely blocks 31, 32, 34, 36, 38, and 44 of FIG. 1 may be located at the site of RF sensor 12, at the interceptor missile 18, or at some other location, the only requirement being that the communication delays be sufficiently short to allow proper operation. Those skilled in the art will appreciate that embodiments of the invention may be practiced with various computer system configurations, including multi-processor systems, microprocessor-based or programmable electronic devices, network PCs, minicomputers, mainframe computers and the like. The invention may be practiced in distributed computing environments where tasks are performed by remote processing devices that are linked through a communications network as discussed herein. In a distributed computing environment, program modules may be located in local and remote memory storage devices.

Suitable computer program code may be provided for performing the functions described herein such as RF discrimination, IR discrimination, RF/IR correlation, probabilistic object selection and engagement, guidance and navigation, and other calculations illustrative of the type of functions which may be performed by computer program code embodiments of the present invention.

By way of non-limiting example only, interceptor missile 18 may include the functionality associated with processing blocks 31 (passive range estimation), 32 (IR discrimination), 34 (RF/IR correlation), 38 (object selection) and 44 (guidance/navigation) with communication paths 19, 22, 31a, 33, and 35 being typical electrical (including optical) communications media for communicating information within interceptor missile 18. RF data from the RF sensor 12 (including RF probability data from RF discriminator 36) located remotely from interceptor missile 18 may be communicated to interceptor missile 18 via one or more radio links (e.g. paths 13, 37).

In another embodiment, the RF sensor 12, IR sensor 18ir and corresponding processing blocks 31, 32, 34, 36, 38, 44 are located at interceptor missile 18 with corresponding electrical and/or optical communications pathways for establishing communications within interceptor missile 18, as is understood by one of ordinary skill in the art.

It is further understood that processing modules 31, 32, 34, 36, 38, 44 may be implemented using one or more corresponding computer processors (e.g. CPU) and associated data storage devices (e.g. memory). The data storage device(s) may store, for example, (i) a program (e.g., computer program code and/or a computer program product) adapted to or configured to direct the processor in accordance with embodiments of the present invention, and (ii) a database adapted to store information that may be utilized to store information required by the program. The program may be stored, for example, in a compressed, an uncompiled and/or an encrypted format, and may include computer program code. The instructions of the program may be read into a main memory of the processor from a non-transitory computer-readable medium other than the data storage device, such as from a ROM or from a RAM. While execution of sequences of instructions in the program causes the processor to perform the process steps described herein, hard-wired circuitry may be used in place of, or in combination with, software instructions for implementation of the processes of embodiments of the present invention. Thus, embodiments of the present invention are not limited to any specific combination of hardware and software. The computer program code required to implement the functions described herein can be developed by a person of ordinary skill in the art, and is not described in detail herein. The term "computer-readable medium" as used herein refers to any medium that provides or participates in providing instructions to the processor of the computing device (or any other processor of a device described herein) for execution. Such a medium may take many forms, including but not limited to, non-volatile media, non-transitory media, tangible media, volatile media, and transmission media. Non-volatile media and tangible media include, for example, optical or magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, other memory chip or cartridge, a carrier wave, or other medium from which a computer can read.

As discussed herein, passive range estimation module 31 receives both IR track data (2D target states and covariance data) and RF track data (3D target states and covariance data) and processes the data to generate passive range estimates used to form 3D IR position and velocity state estimates. This information is applied to RF/IR module 34. The result of the RF/IR correlation algorithm in block 34 is an M×N RF/IR correlation matrix (where M denotes the number of RF objects being tracked and N denotes the number of IR objects being tracked). The M×N RF/IR correlation matrix represents the confidence or probability that the $i^{th}$ RF object is correlated or matched with the $j^{th}$ IR object. The M×N RF/IR correlation matrix is applied from RF/IR correlation block 34 to RF Confusion matrix from block 36 by way of a path 35. The correlation in block 34 can be performed using a common RF and IR metric, such as position or velocity, for each tracked object of each sensor, and may be based on computing the maximum likelihood or Mahalanobis distance of every combination of RF and IR objects. If an RF object and an IR object cannot be correlated with a high level of confidence, then the correlation is low for that pairing and results in a low correlation probability within the correlation matrix.

Figure 2:
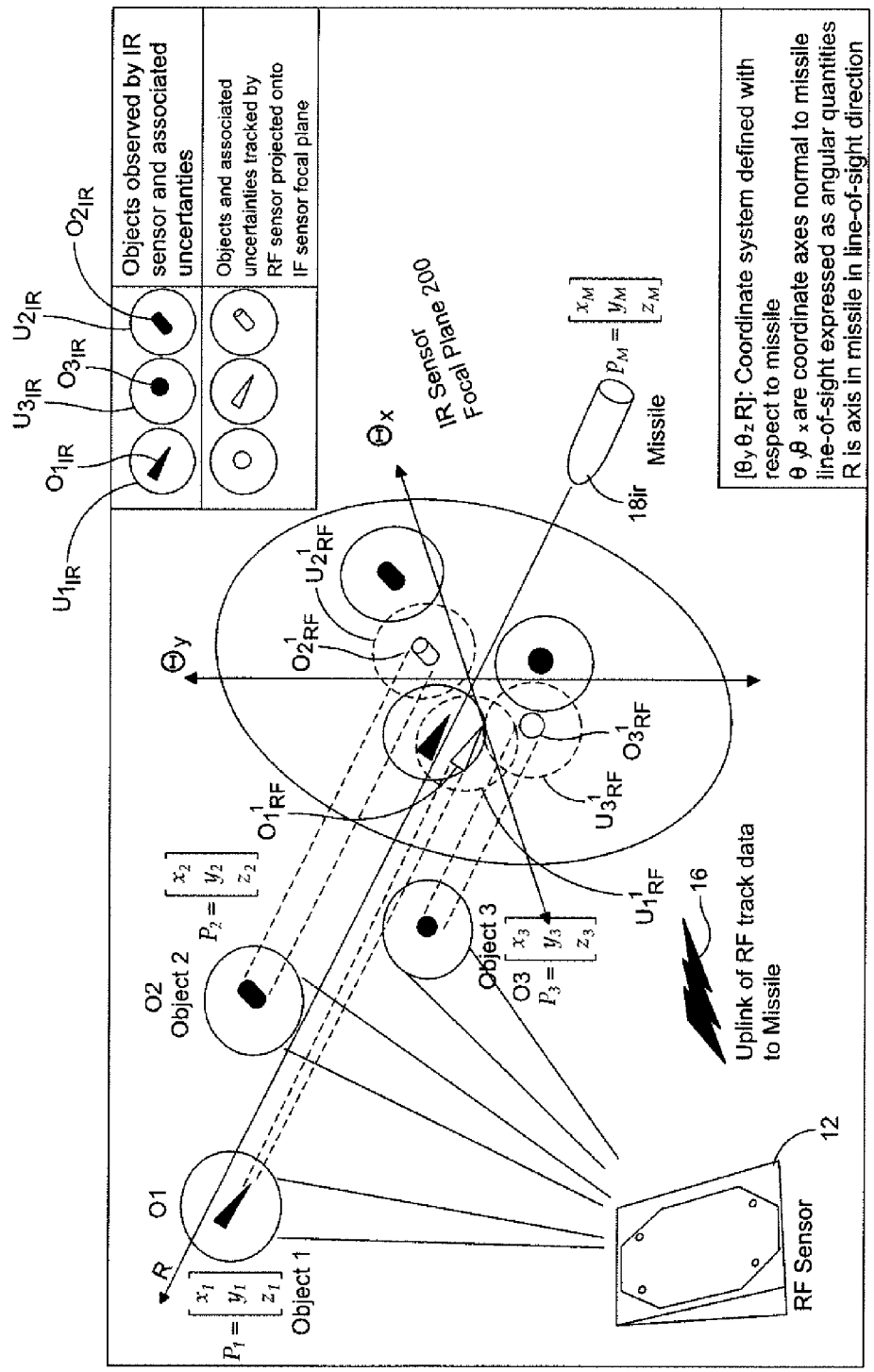
FIG. 2 is a representation of a portion of the system geometry showing ground-based RF sensor track data and IR sensor data and associated uncertainties in a coordinate system defined relative to the intercepting missile IR sensor.

Referring now to FIG. 2, in conjunction with the processing architecture shown and described with regards to FIG. 1, in a typical BM engagement, a ground-based RF sensor 12 will track and uplink (16) the 3-dimensional position and velocity of any number of BM objects (e.g. O1, O2, O3) to the intercepting missile. Position vector information associated with each of the objects O1, O2, O3 are illustrated as p1, p2 and p3, respectively, relative to a given coordinate system. Interceptor missile 18 (with IR sensor) position $p_M$ is also obtained from the sensor data. A second coordinate system is defined with respect to the interceptor missile and given as [Θy, Θx, R]. The axes indicated as Θy, Θx are coordinate axes normal to the missile line of sight expressed as angular quantities with R as the axis in the missile line of sight direction. In an exemplary embodiment, processing onboard the missile will generate the projected RF states shown in dashed lines as $(O1'_{RF}, O2'_{RF}, O3'_{RF})$ for each object projected within the IR sensor focal plane 200 along with their associated uncertainties $(U1'_{RF}, U2'_{RF}, U3'_{RF})$. These projected states are then compared with the object states estimated and shown in solid lines as $(O1_{IR}, O2_{IR}, O3_{IR})$ along with their associated uncertainties $(U1_{IR}, U2_{IR}, U3_{IR})$ using the onboard IR sensor 18ir. Correlation processing will attempt to consolidate these two sets of states. As can be seen from the illustration, depending on the intercept geometry, the objects may be separated by significant distances relative to their uncertainties in 3-dimensional space, but when projected onto the IR sensor focal plane, they may appear very close together, with some object areas of uncertainties overlapping.

FIG. 3 shows an example of a nominal IR scenario where the separation distances are sufficient to avoid overlapping regions of ambiguity when projected into the 2D IR sensor focal plane. As shown, a correlation process will typically use an angular distance metric $\Delta \overline{\lambda}$ derived from the RF and IR object states within the sensor focal plane $\overline{\lambda}_{RF}$, and $\overline{\lambda}_{IR}$. Thus, in the case where the objects are separated by sufficient distances relative to their uncertainties within the IR sensor focal plane, the objects as viewed by the IR sensor may be similar to what is illustrated in FIG. 3 and correlation probabilities should be relatively high.

Figure 4:
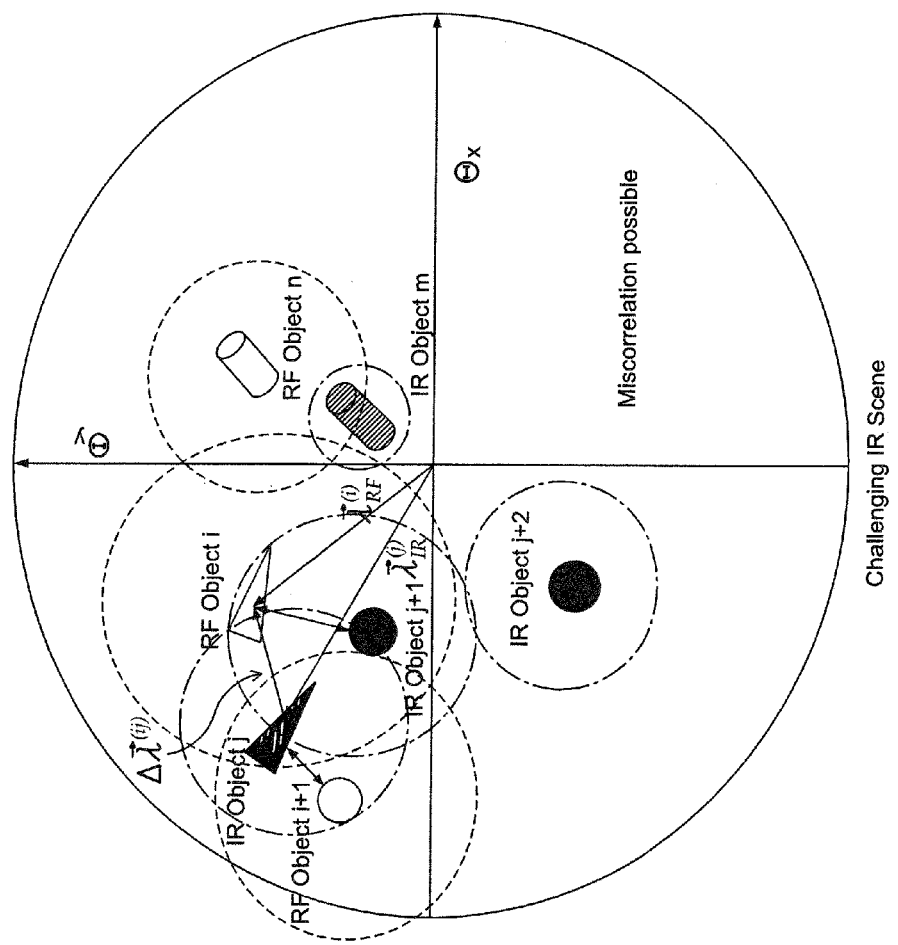
FIG. 4 is a notional representation of ballistic objects to be discriminated in a more challenging IR scenario where objects have an increased likelihood of RF/IR miscorrelation resulting from overlaps in regions of uncertainty for RF and IR objects.

FIG. 4 illustrates a more complicated IR scenario, wherein the objects are not separated by sufficient distances relative to their uncertainties within the IR sensor focal plane. As seen, the single threat conical object with multiple decoy objects (i.e. circular and cylindrical objects) includes multiple overlapping regions of uncertainties associated each of RF object i (i.e. threat object), IR object j (i.e. threat object), RF object i+1 (decoy) and IR object j+1 (decoy). For example, RF object i (threat) can be miscorrelated with IR object j+1 (decoy). Similarly, IR object j (threat) can be miscorrelated with RF object i+1 (decoy). In this case, the angles only information associated with the IR sensor 18ir may produce inaccurate results. Range information would provide significant improvements.

The passive range estimating engagement system according to the present disclosure provides 3-dimensional states of objects travelling in a ballistic manner within an IR sensor FOV using 2-dimensional sensor angular measurements. In this method, the sensor may be located on a moving platform, including an intercepting missile. These 3D object states are used to provide improved inputs to the other engagement system modules such as RF/IR correlator 34 (FIG. 1). The range derived provides an extra dimension of object separation in the RF/IR correlation algorithm, resulting in improved object selection, higher probability for engagement success, mitigation of the effects of challenging intercept geometries and improved guidance and navigation of the intercepting missile.

Figure 7:
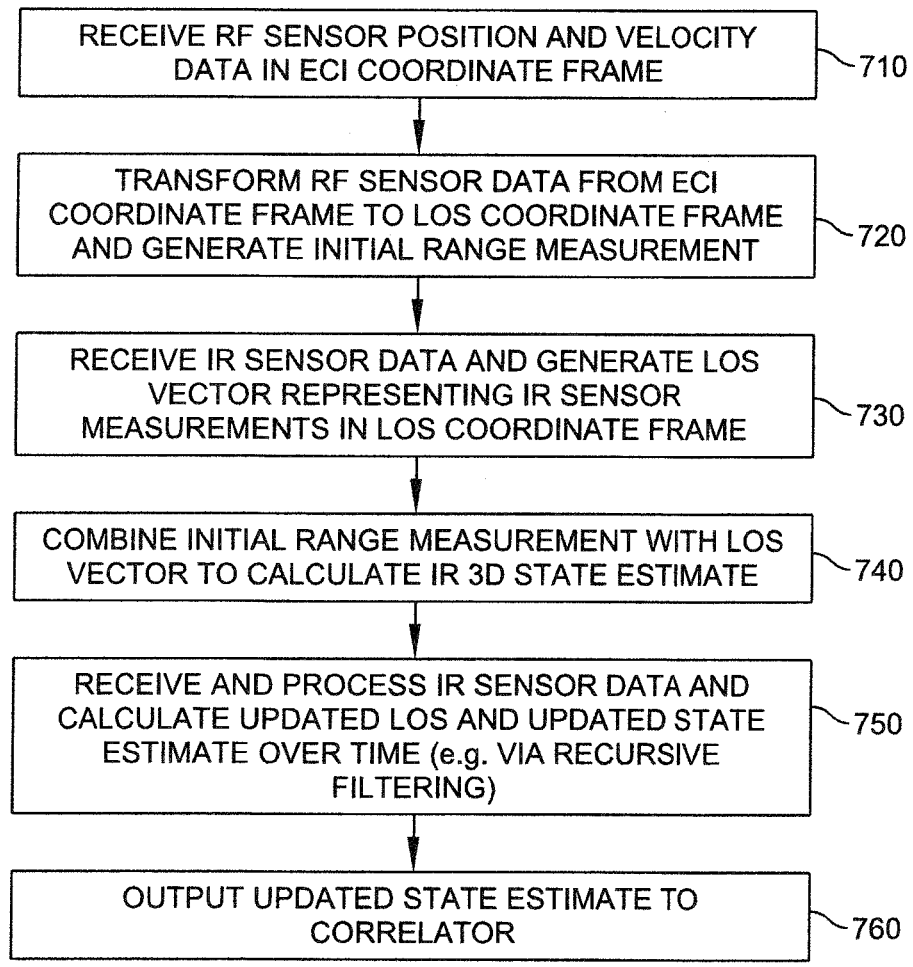
FIG. 7 is a process flow for estimating missile-to-object range according to an aspect of the disclosure.

According to an aspect of the disclosure, and with reference to the process flow of FIG. 7, in order to derive missile-to-object range, the object 3-dimensional position and velocity are estimated in a given coordinate frame (block 710) such as Earth-Centered Inertial (ECI). The state being estimated is described as shown below.

$$\vec{s} = \begin{bmatrix} \vec{x}_T \\ \dot{\vec{x}}_T \end{bmatrix} \qquad \text{eq. 1}$$

Where, $\vec{x}_T$ and $\dot{\vec{x}}_T$ are the object, or target position and velocity in ECI. The state dynamics can be described as shown below.

$$\dot{\vec{s}} = \begin{bmatrix} \dot{\vec{x}}_T \\ \ddot{\vec{x}}_T \end{bmatrix} \qquad \text{eq. 2}$$

$$\ddot{\vec{x}}_T = \frac{-\mu \cdot \vec{x}_T}{\|\vec{x}_T\|^3} + \vec{a}_{J2} \qquad \text{eq. 3}$$

Where, the acceleration, $\ddot{\vec{x}}_T$ contains a term for gravity and a higher order gravitational term, $\vec{a}_{J2}$. $\mu$ is the Earth's gravitational constant and $\|\bullet\|$ denotes the magnitude of a vector.

Figure 5:
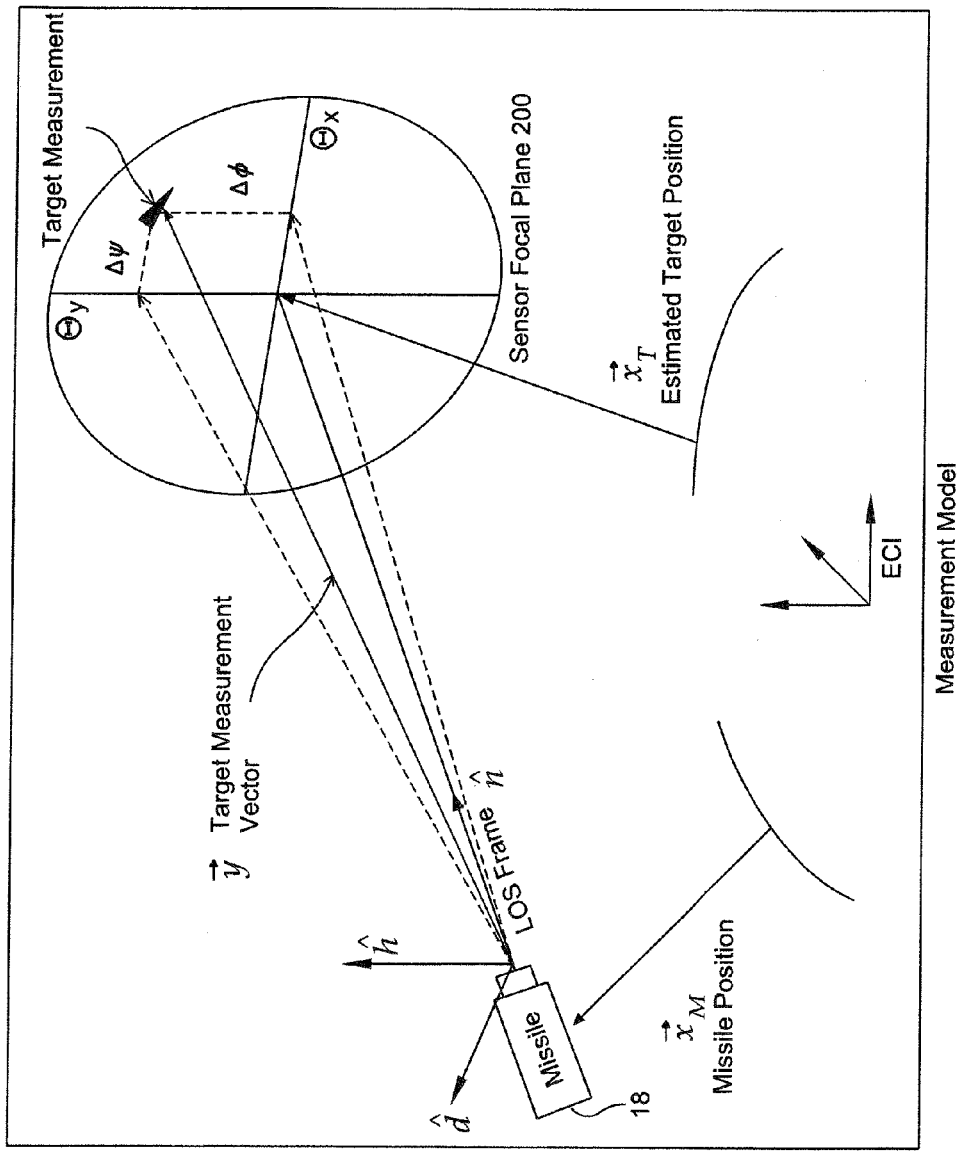
FIG. 5 is a notional representation of an IR sensor measurement model used to estimate the missile-to-object range.

In order to estimate the missile-to-object range, the IR sensor measurement is modeled and related to the state. The measurement model is illustrated in the FIG. 5. As shown, the line-of-sight (LOS) vector is determined based on the known missile position $\vec{x}_M$ (e.g. according to on board missile position sensor) and the best known estimate of the target position $\vec{x}'_T$, from the radar, according to the calculation:

$$\hat{n} = \frac{\vec{x}'_T - \vec{x}_M}{\|\vec{x}'_T - \vec{x}_M\|} \qquad \text{eq. 4}$$

A coordinate frame attached to the interceptor missile 18 (FIG. 1), the LOS frame is formed by defining two other orthogonal basis vectors:

$$\hat{d} = \frac{\hat{n} \times \vec{x}_M}{\|\hat{n} \times \vec{x}_M\|} \qquad \text{eq. 5}$$

$$\hat{h} = \hat{n} \times \hat{d} \qquad \text{eq. 6}$$

These 3X1 vectors provide for the transformation of coordinate systems from ECI to LOS. The transformation (block 720) to a common frame (e.g. from ECI to LOS) is provided by:

$$T^{LOS}_{ECI} = \begin{bmatrix} \hat{n} & \hat{d} & \hat{h} \end{bmatrix}^T \qquad \text{eq. 7}$$

In the LOS coordinate frame, $\hat{n}^{LOS}=[1\ 0\ 0]^T$ where T is the transpose matrix. To model a measurement, $\hat{n}$ is rotated by a small rotation representing the measurement errors. The measurements (block 730) in the LOS frame (e.g. IR sensor measurements) may then be modeled as shown below.

$$\vec{y}^{LOS} = (I + [\Delta\hat{\theta}]^{LOS}) \cdot \hat{n}^{LOS} \qquad \text{eq. 8}$$

Where I is the identity matrix and where, $$[\Delta\hat{\theta}]^{LOS} = \begin{bmatrix} 0 & -\Delta\psi & \Delta\phi \\ \Delta\psi & 0 & 0 \\ -\Delta\phi & 0 & 0 \end{bmatrix} \qquad \text{eq. 9}$$

$[\Delta\hat{\theta}]$ is a parameter that accounts for noise and represents a skewed symmetry of the matrix. $\Delta\psi$ and $\Delta\phi$ represent the IR sensor angular measurements, which can be approximated as small angles. The measurement then becomes: $\vec{y}^{LOS}=[1+\Delta\psi-\Delta\phi]^T$. Since there are only two independent parameters, it is convenient to express the measurement in two dimensions. A projection matrix is used to single out the components of the measurement in the sensor focal plane as:

$$A_P = (I - \hat{n} \cdot \hat{n}^T) \qquad \text{eq. 10}$$

The measurement can be represented in 2D as follows.

$$\vec{y}^{LOS'} = A_P \vec{y}^{LOS} = \begin{bmatrix} 0 \\ \Delta\psi \\ -\Delta\phi \end{bmatrix} \Rightarrow \begin{bmatrix} \Delta\psi \\ -\Delta\phi \end{bmatrix} \qquad \text{eq. 11}$$

Now that the measurement has been modeled, it can be related to the state by combining the IR sensor LOS and RF range (block 740) according to the equation:

$$\vec{y}^{LOS'} = H\left( \begin{bmatrix} \vec{x}_T \\ \dot{\vec{x}}_T \end{bmatrix} - \begin{bmatrix} \vec{x}_M \\ \dot{\vec{x}}_M \end{bmatrix} \right) + \vec{v} \qquad \text{eq. 12}$$

The observation matrix H, is a mapping from the 2-dimensional LOS frame to the 3-dimensional ECI frame and uses the LOS basis vectors, $\hat{d}$ and $\hat{h}$, and the current estimate of the missile-to-object range $\hat{\rho}$. Initially, this range can be obtained from data provided by the radar, or set to an arbitrary value.

$$H = \begin{bmatrix} \frac{1}{\hat{\rho}} \begin{bmatrix} \hat{d} & \hat{h} \end{bmatrix}^T & \begin{matrix} 0 & 0 & 0 \\ 0 & 0 & 0 \end{matrix} \end{bmatrix} \qquad \text{eq. 13}$$

Using the above measurement equation, the state may be estimated and the quality of the estimate improved over time using consecutive measurements (block 750) of IR sensor data according to eq. 12. In one embodiment, an estimation filter such as at least a six (6) state estimation filter may be utilized. This can be done using well-known methods of a recursive estimation algorithm, such as Kalman filtering, by way of non-limiting example only. The estimated state output data may be input to a correlator function (block 760) for providing improved inputs to RF/IR correlator 34 (FIG. 1). The range derived provides an extra dimension of object separation in the RF/IR correlator, resulting in improved object selection, higher probability for engagement success, mitigation of the effects of challenging intercept geometries and improved guidance and navigation of the intercepting missile.

Figure 8:
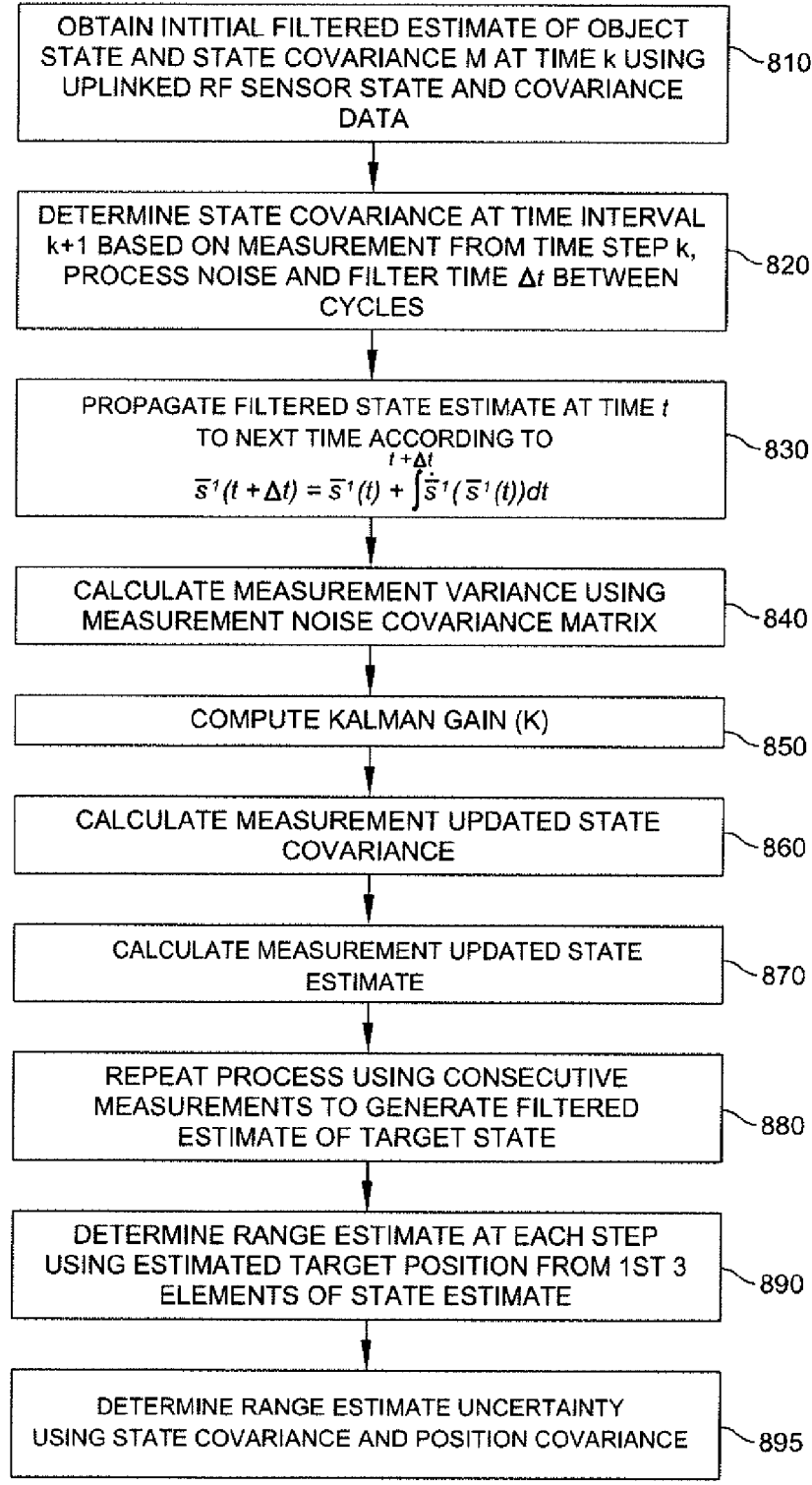
FIG. 8 is another implementation of a process flow for estimating missile-to-object range according to an aspect of the disclosure.

One implementation of the passive range estimation method according to the present disclosure may be illustrated using a Kalman filter. With reference to the process flow of FIG. 8, a filtered estimate of the state $\vec{s}'$ and the state covariance M can be initialized (block 810) using the uplinked state and covariance from the RF sensor. After initialization, the following steps may be repeated at each time step to develop an improved state estimate.

The state covariance at time step k based on the measurement from time step k, M(k|k) is propagated to the next time step (block 820). This results in the state covariance at time step k+1 based on the measurement from time step k, M(k+1|k).

$$M(k+1|k)=FM(k|k)F^T+GWG^T \qquad \text{eq. 14}$$

Where, $$F = \begin{bmatrix} I_{3\times3} & I_{3\times3}\Delta t \\ 0_{3\times3} & I_{3\times3} \end{bmatrix} \qquad \text{eq. 15}$$

$$G = \begin{bmatrix} \frac{1}{2}\Delta t^2 I_{3\times3} \\ \Delta t I_{3\times3} \end{bmatrix} \qquad \text{eq. 16}$$

And W is a user-defined process noise, $\Delta t$ is the filter time between cycles, $I_{3\times3}$ is a 3×3 identity matrix and $0_{3\times3}$ is a 3×3 matrix of zeros. The filtered state estimate at time t is propagated to the next time step (block 830).

$$\vec{s}'(t+\Delta t) = \vec{s}'(t) + \int_{t}^{t+\Delta t} \dot{\vec{s}}'(\vec{s}'(t))\,dt \qquad \text{eq. 17}$$

This integral can be evaluated by many known methods, for example, a $4^{th}$ Order Runge-Kutta algorithm may be implemented. The measurement variance is then calculated (block 840) as shown below:

$$Q=HM(k+1|k)H^T+N \qquad \text{eq. 18}$$

where, N is the measurement noise covariance matrix, defined as shown below.

$$N = \begin{bmatrix} \sigma_\theta^2 & 0 \\ 0 & \sigma_\theta^2 \end{bmatrix} \qquad \text{eq. 19}$$

And $\sigma_\theta^2$ is the square of the 1-sigma measurement noise variance, input by the user. The Kalman gain K is then computed (block 850).

$$K=M(k+1|k)H^T Q^{-1} \qquad \text{eq. 20}$$

The measurement updated state covariance is calculated (block 860).

$$M(k+1|k+1)=LM(k+1|k)L^T+KNK^T \qquad \text{eq. 21}$$

Where, L=I−KH. And the measurement updated state estimate is calculated (block 870).

$$\vec{s}'(k+1|k+1)=\vec{s}'(k+1|k)+K[\vec{y}(k+1)-H\vec{s}'(k+1|k)] \qquad \text{eq. 22}$$

This process is repeated over time using consecutive measurements to develop a filtered estimate of the target state (block 880). The range estimate at each time step can be obtained as follows.

$$\hat{\rho}=\|\vec{x}'_T-\vec{x}_M\| \qquad \text{eq. 23}$$

Where, $\vec{x}'_T=\vec{s}'_{1-3}$ is the estimated target position obtained from the first three elements of the state estimate (block 890).

The state covariance is a 6×6 matrix which can be divided into four 3×3 matrices, one for position $M_P$, one for velocity $M_V$ and two cross-covariance matrices $M_{P/V}$ and $M_{V/P}$.

$$M = \begin{bmatrix} M_P & M_{P/V} \\ M_{V/P} & M_V \end{bmatrix} \qquad \text{eq. 24}$$

To obtain the quality of the range estimate, only $M_P$ is important. Given $M_P$, the position covariance in ECI, obtained from the first 3 rows and columns of M(k+1|k+1), the range estimate uncertainty can be obtained (block 895).

$$M_P^{LOS}=T_{ECI}^{LOS}M_P T_{ECI}^{LOS^T} \qquad \text{eq. 25}$$

$$\sigma_\rho = \sqrt{M_P^{LOS}(1,1)} \qquad \text{eq. 26}$$

The 1-sigma range uncertainty standard deviation is the (1,1) element of the position error covariance matrix expressed in the LOS coordinate frame. Data representing the measurement updated state estimate $\vec{s}'$ or target position, and covariance data M determined as outlined in eqs. 22 and 24 above, may be provided as an output of the passive range estimation module to the input of an RF/IR correlation module shown in FIG. 1. In a particular embodiment, data representing the determined range estimate and range uncertainty determined as outlined in eqs. 23 and 26 above may be provided as an output of the passive range estimation module to the input of the RF/IR correlation module shown in FIG. 1. Further, the process may be repeated until a threshold value indicative of a target level of convergence is reached, as is understood by comparison of a least one of the position, range, velocity, and covariance measurements with a targeted threshold value.

Figure 6:
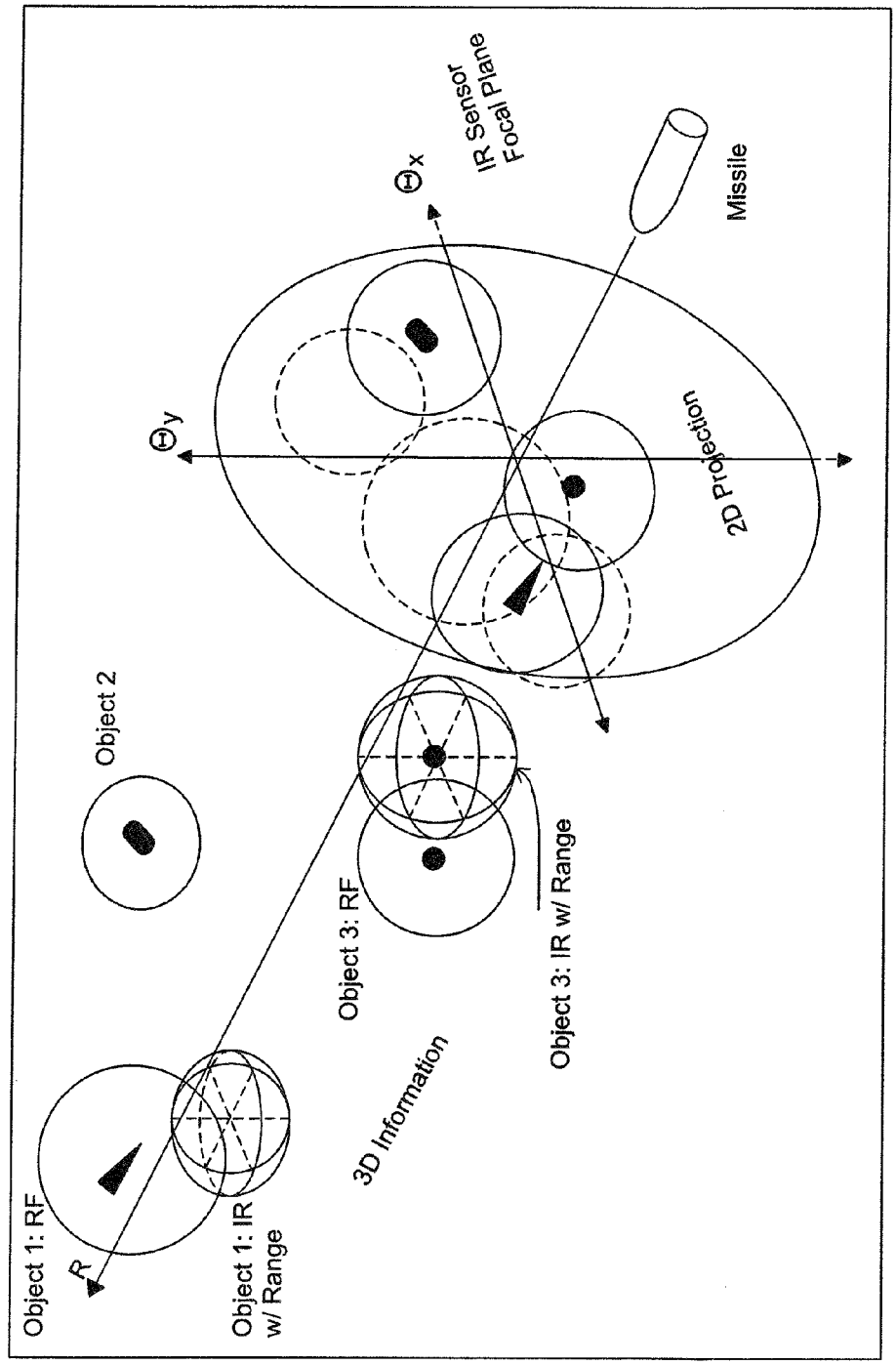
FIG. 6 is a notional representation of ballistic objects to be discriminated in the IR scenario of FIG. 4 through application of range estimated data in 3D representation of the IR scene.

As shown herein, the correlation problem can now be solved with a higher degree of certainty given this new range information. Referring back to the scenario depicted in FIG. 4, the 2D projection resulting from the angles-only information would produce closely spaced objects with a high probability of miscorrelation. Deriving and applying the estimated range information results according to aspects of the present disclosure results in a full 3D representation of the scene, where the previously ambiguous objects are now distinct. FIG. 6 illustrates such a configuration.

Thus, there has been shown a passive range estimating engagement system and method that provides 3-dimensional states of objects travelling in a ballistic manner within an IR sensor FOV using 2-dimensional sensor angular measurements. In this method, the sensor may be located on a moving platform, including an intercepting missile. These 3D object states are used to provide improved inputs to the other engagement system modules. The range derived provides an extra dimension of object separation in the RF/IR correlation algorithm, resulting in improved object selection, higher probability for engagement success, mitigation of the effects of challenging intercept geometries and improved guidance and navigation of the intercepting missile.

Thus, there is disclosed a system and method for estimating range of an object of interest in a cloud of objects of lesser interest and travelling in a ballistic manner within the field of view of an IR sensor. In one embodiment, a processor onboard the interceptor missile receives RF sensor data associated with an object, wherein the RF data includes position and velocity data in a given coordinate frame (e.g. ECI frame). The processor transforms the RF sensor data from the given coordinate frame to an IR coordinate frame and subtracts the sensor location in the IR coordinate frame to generate an initial range measurement perpendicular to the IR sensor focal plane. IR sensor data associated with an object is received and an initial line of sight (LOS) vector generated in the IR coordinate frame. The processor combines the initial range measurement represented in the IR sensor focal plane with the initial line of sight (LOS) vector in the IR sensor coordinate frame to form an initial IR 3-D state estimate. A six (6) state estimation filter (e.g. Kalman filter) is initialized to provide a position estimate using the initial IR 3-D measurement represented in the IR sensor focal plane. IR sensor data is received including IR angular measurements associated with an object to generate a line of sight (LOS) vector in the IR sensor coordinate frame. Estimation filtering is then performed using the at least 6-state estimation filter 3-D position and velocity estimates using only the IR LOS measurements as inputs to generate updated 3-D position and velocity state estimates. The process is repeated using consecutive IR sensor measurements and filtered to obtain filtered estimates of the target state and state covariance until the measurement residuals meet a given threshold criteria (e.g. steady state, given uncertainty range, and the like). Data representing the measurement updated state estimate or target position, and covariance data, may be provided as input to a correlator for performing RF/IR correlation processing. A range estimate and range uncertainty based on the above measurements may be derived and provided as input to the correlator.

Although this invention has been described with reference to particular embodiments, it is to be understood that the embodiments and variations shown and described herein are for illustration purposes only. Modifications to the current design may be implemented by those skilled in the art, without departing from the scope of the invention. Further, any of the functions and steps provided herein may be implemented in hardware, software or a combination of both and may reside on one or more processing devices located at any location of a configuration linking the elements of FIG. 1.

Furthermore, although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method for estimating range of an object of interest in a cloud of objects of lesser interest and travelling in a ballistic manner within the field of view of an IR sensor, the method comprising:
   (a) receiving in an object selection and discrimination processor, RF sensor data associated with an object, the RF data including position and velocity data in a given coordinate frame;
   (b) transforming in said object selection and discrimination processor, the RF sensor data from the given coordinate frame to an IR coordinate frame and subtracting the sensor location in the IR coordinate frame to generate an initial range measurement perpendicular to the IR sensor focal plane;
   (c) receiving IR sensor data in said object selection and discrimination processor, associated with an object and generating an initial line of sight (LOS) vector in the IR coordinate frame;
   (d) combining in said object selection and discrimination processor, the initial range measurement represented in the IR sensor focal plane with the initial line of sight (LOS) vector in the IR sensor coordinate frame to form an initial IR 3-D state estimate;
   (e) initializing at least a 6-state estimation filter for providing a position estimate using the initial IR 3-D measurement represented in the IR sensor focal plane;
   (f) receiving IR sensor data including IR angular measurements associated with an object and generating in said object selection and discrimination processor a line of sight (LOS) vector in the IR sensor coordinate frame;
   (g) filtering using the at least 6-state estimation filter 3-D position and velocity estimates using the IR LOS measurements as inputs to generate in said object selection and discrimination processor, updated 3-D position and velocity state estimates; and
   (h) comparing in said selection discrimination processor, said updated 3-D position and velocity state estimates with a threshold value, and repeating steps (f) and (g) over a given time interval until said threshold value is reached.

2. The method of claim 1, further comprising determining components of the IR sensor measurements in the sensor focal plane using a projection matrix.

3. The method of claim 2, further comprising rotating the LOS vector a given rotation amount to account for measurement errors.

4. The method of claim 1, further comprising updating covariance data of the object as sensed by the IR sensor based on said generated state estimates.

5. The method of claim 1, wherein said given coordinate frame is an Earth-Centered Inertial (ECI) coordinate frame.

6. The method of claim 1, wherein at least six state estimation filter comprises a Kalman filter.

7. The method of claim 1, wherein said steps (a)-(h) are performed at an interceptor missile including the IR sensor.

8. The method of claim 1, further comprising determining a range estimate based on the updated position and velocity estimates and providing as an output to a correlator.

9. The method of claim 1, further comprising determining a range uncertainty estimate based on the updated position and velocity estimates and providing as an output to a correlator.

10. A system for estimating range of an object of interest in a cloud of objects of lesser interest and travelling in a ballistic manner within the field of view of an IR sensor, comprising: a processor configured to:
   (a) receive RF sensor data associated with an object, the RF data including position and velocity data in a given coordinate frame;
   (b) transform the RF sensor data from the given coordinate frame to an IR coordinate frame and subtract the sensor location in the IR coordinate frame to generate an initial range measurement perpendicular to the IR sensor focal plane;
   (c) receive IR sensor data associated with an object and generate an initial line of sight (LOS) vector in the IR coordinate frame;
   (d) combine the initial range measurement represented in the IR sensor focal plane with the initial line of sight (LOS) vector in the IR sensor coordinate frame to form an initial IR 3-D state estimate;
   (e) initialize at least a 6-state estimation filter for providing a position estimate using the initial IR 3-D measurement represented in the IR sensor focal plane;
   (f) receive IR sensor data including IR angular measurements associated with an object and generate a line of sight (LOS) vector in the IR sensor coordinate frame;
   (g) generate updated 3-D position and velocity state estimates by filtering using the at least 6-state estimation filter 3-D position and velocity estimates using the IR LOS measurements as inputs; and (h) compare said updated 3-D position and velocity state estimates with a threshold value corresponding to a predetermined uncertainty estimate, and repeat steps (f) and (g) over a given time interval until said threshold value is reached.

11. The system of claim 10, wherein the processor is further configured to receive IR sensor angular measurements of said object and determine components of the measurement in the sensor focal plane using a projection matrix.

12. The system of claim 11, wherein the processor is further configured to provide an offset to the determined LOS vector to account for measurement errors.

13. The system of claim 10, wherein the processor is further configured to update covariance data of the object as sensed by the IR sensor based on said generated state estimates.

14. The system of claim 10, wherein said given coordinate frame is an Earth-Centered Inertial (ECI) coordinate frame.

15. The system of claim 10, wherein the at least six state estimation filter comprises a Kalman filter.

16. The system of claim 10, wherein the processor is configured on an interceptor missile including the IR sensor.

17. The system of claim 10, wherein the processor is configured to determine a range estimate based on the updated position and velocity estimates and provide as an output to a correlator.

18. The system of claim 10, wherein the processor is configured to determine a range uncertainty estimate based on the updated position and velocity estimates and provide as an output to a correlator.

19. The method of claim 1, wherein said threshold value corresponds to a predetermined target level of uncertainty associated with at least one of target range and position error.

20. The system of claim 10, wherein said threshold value corresponds to a predetermined target level of uncertainty associated with at least one of target range and position error.

* * * * *